(12) United States Patent
Baker et al.

(10) Patent No.: US 7,992,829 B1
(45) Date of Patent: Aug. 9, 2011

(54) PIPE AND CONDUIT CLAMP FOR STRUT

(75) Inventors: Glenn A. Baker, Cleveland, OH (US); Michael J. Gardner, Hudson, OH (US)

(73) Assignee: Halex Co./a Scott-Fetzer Company, Cleveland, OH (US)

( * ) Notice: Subject to any disclaimer, the term of this patent is extended or adjusted under 35 U.S.C. 154(b) by 0 days.

(21) Appl. No.: 12/760,211

(22) Filed: Apr. 14, 2010

(51) Int. Cl.
*F16L 3/00* (2006.01)

(52) U.S. Cl. ........... 248/73; 248/62; 248/67.7; 248/74.4

(58) Field of Classification Search ............... 248/65, 248/67.7, 70, 72, 74.4, 74.1, 62, 73, 71, 68.1; 24/279

See application file for complete search history.

(56) References Cited

U.S. PATENT DOCUMENTS

| | | | |
|---|---|---|---|
| 4,730,800 A * | 3/1988 | Engman | 248/67 |
| 5,141,186 A | 8/1992 | Cusic | |
| 5,384,936 A * | 1/1995 | Van Walraven | 24/279 |
| 5,799,907 A * | 9/1998 | Andronica | 248/62 |
| 5,855,342 A * | 1/1999 | Hawkins et al. | 248/68.1 |
| 6,494,415 B1 * | 12/2002 | Roth | 248/74.1 |
| D538,148 S * | 3/2007 | Dinh et al. | D8/396 |
| 7,591,442 B2 | 9/2009 | Dinh et al. | |
| 2006/0027715 A1 * | 2/2006 | Dinh et al. | 248/65 |
| 2006/0038398 A1 * | 2/2006 | Whipple et al. | 285/24 |
| 2007/0040075 A1 * | 2/2007 | Moretto | 248/67.7 |

OTHER PUBLICATIONS

Halex Product Brochure 2008.

* cited by examiner

*Primary Examiner* — Terrell McKinnon
*Assistant Examiner* — Bradley H Duckworth
(74) *Attorney, Agent, or Firm* — Emerson Thomson Bennett; Roger D. Emerson, Esq.

(57) ABSTRACT

A clamp apparatus including a first strap and a second strap. The first strap including an attachment end for attachment to an associated structural member, an intermediate portion having a first radius of curvature for contacting an elongate article, and a connection end having a first aperture for receiving a fastener. The second strap including an attachment end for attachment to an associated structural member, an intermediate portion having a second radius of curvature for contacting the elongate article, and a connection end having a second aperture for receiving the fastener. The first radius of curvature is different from the second radius of curvature.

20 Claims, 5 Drawing Sheets

PIPE AND CONDUIT CLAMP FOR STRUT

I. BACKGROUND

A. Field of Invention

This invention relates generally to methods and apparatus for securing a pipe, channel or the like to a strut or channel.

B. Description of the Related Art

Presently, pipe or conduit clamps are specifically designed to accept and secure pipe or conduit having a particular outside diameter. For example, one particular clamp may be designed for specific use with a ½" nominally sized pipe or conduit, while a different clamp is designed for use with a ¾" nominally sized pipe or conduit. While known clamps work well for their intended uses, each size of pipe or conduit requires a different clamp.

Therefore, what is needed is an apparatus designed to receive and secure different sized pipes or conduits, which have different outside diameters.

II. SUMMARY

The present invention provides an apparatus that is designed to independently accept and secure two or more differently sized pipes or conduits, in which the pipes or conduits have different outside diameters. Particular embodiments of the present invention include methods and apparatus for securing differently sized pipes and conduits to a strut, channel, or the like.

According to one embodiment of this invention, a clamp apparatus includes: a first strap including an attachment end for attachment to an associated structural member, an intermediate portion having a first radius of curvature for contacting an elongate article, and a connection end having a first aperture for receiving a fastener; and a second strap including an attachment end for attachment to an associated structural member, an intermediate portion having a second radius of curvature for contacting the elongate article, and a connection end having a second aperture for receiving the fastener; in which the first radius of curvature is substantially different than the second radius of curvature; in which the clamp apparatus supports elongate articles of different sizes. The different size elongate articles can have different diameters. In another embodiment, the first radius of curvature is greater than the second radius of curvature. In another embodiment, a first angle between the connection end and the intermediate portion of the first strap is less than a second angle between the connection end and the intermediate portion of the second strap. In another embodiment, the elongate article is selected from the group consisting of a pipe and a conduit.

According to another embodiment of this invention, a clamp apparatus includes: a first strap including an attachment end for attachment to an associated structural member, an intermediate portion having a first radius of curvature for contacting an elongate article, and a connection end having a first aperture for receiving a fastener; and a second strap including an attachment end for attachment to an associated structural member, an intermediate portion having a second radius of curvature for contacting the elongate article, and a connection end having a second aperture for receiving the fastener; in which the first radius of curvature is substantially different than the second radius of curvature. In another embodiment, the first radius of curvature is greater than the second radius of curvature. In another embodiment, the clamp apparatus supports elongate articles of different sizes. The different size elongate articles can have different diameters. In another embodiment, the elongate article is selected from the group consisting of a pipe and a conduit. In another embodiment, the first strap is longer than the second strap. In another embodiment, the first aperture is an elongated slot. In another embodiment, the second aperture is threaded for receiving a threaded shank of the fastener. In another embodiment, the fastener comprises a head, a threaded shank, and a shoulder having a smaller diameter than the threaded shank, in which the width of the elongated slot is sized to maintain the fastener within the elongated slot and still allow the fastener to move along the length of the elongated slot. In another embodiment, the associated structural member includes a channel and a pair of projecting edges located near the entrance of the channel, and the connection ends of both the first strap and the second strap include a pair of recesses for receiving the pair of projecting edges of the associated structural member.

According to another embodiment of this invention, a clamp apparatus includes: a first strap including an attachment end for attachment to an associated structural member, an intermediate portion having a first radius of curvature for contacting an elongate article, and a connection end having a first aperture for receiving a fastener; and a second strap including an attachment end for attachment to an associated structural member, an intermediate portion having a second radius of curvature for contacting the elongate article, and a connection end having a second aperture for receiving the fastener; in which a first angle between the connection end and the intermediate portion of the first strap is different than a second angle between the connection end and the intermediate portion of the second strap. In another embodiment, the first angle is less than the second angle. In another embodiment, the first angle is less than about thirty eight degrees, and the second angle is greater than about thirty eight degrees. In another embodiment, the first angle is less than about forty degrees, and the second angle is greater than or equal to about forty degrees. In another embodiment, the first angle is less than or equal to about thirty five degrees, and the second angle is greater than or equal to about forty degrees. In another embodiment, the first angle is less than or equal to about thirty degrees, and the second angle is greater than or equal to about forty degrees. In another embodiment, the first angle is about twenty five degrees, and the second angle is about forty degrees. In another embodiment, the first angle is about thirty five degrees, and the second angle is about forty degrees. In another embodiment, the first angle is between about twenty degrees and about thirty five degrees, and the second angle is between about forty degrees and about forty five degrees. In another embodiment, the first angle is between about twenty degrees and about thirty degrees, and the second angle is between about thirty five degrees and about forty five degrees. In another embodiment, the first angle is between about thirty degrees and about thirty five degrees, and the second angle is between about forty degrees and about forty five degrees. In another embodiment, the first aperture is an elongated slot, and wherein the second aperture is threaded for receiving a threaded shank of the fastener. In another embodiment, the fastener comprises a head, a threaded shank, and a shoulder having a smaller diameter than the threaded shank, wherein the width of the elongated slot is sized to maintain the fastener within the elongated slot and still allow the fastener to move along the length of the elongated slot. In another embodiment, the associated structural member includes a channel and a pair of projecting edges located near the entrance of the channel, and wherein the connection ends of both the first strap and the second strap include a pair of recesses for receiving the pair of projecting edges of the associated structural member.

One advantage of this invention is the ability to secure different sized pipes and conduits to a strut or channel using the same clamp.

Still other benefits and advantages of the invention will become apparent to those skilled in the art to which it pertains upon a reading and understanding of the following detailed specification.

III. BRIEF DESCRIPTION OF THE DRAWINGS

The invention may take physical form in certain parts and arrangement of parts, embodiments of which will be described in detail in this specification and illustrated in the accompanying drawings which form a part hereof and wherein.

IV. DETAILED DESCRIPTION OF THE INVENTION

Figure 1:
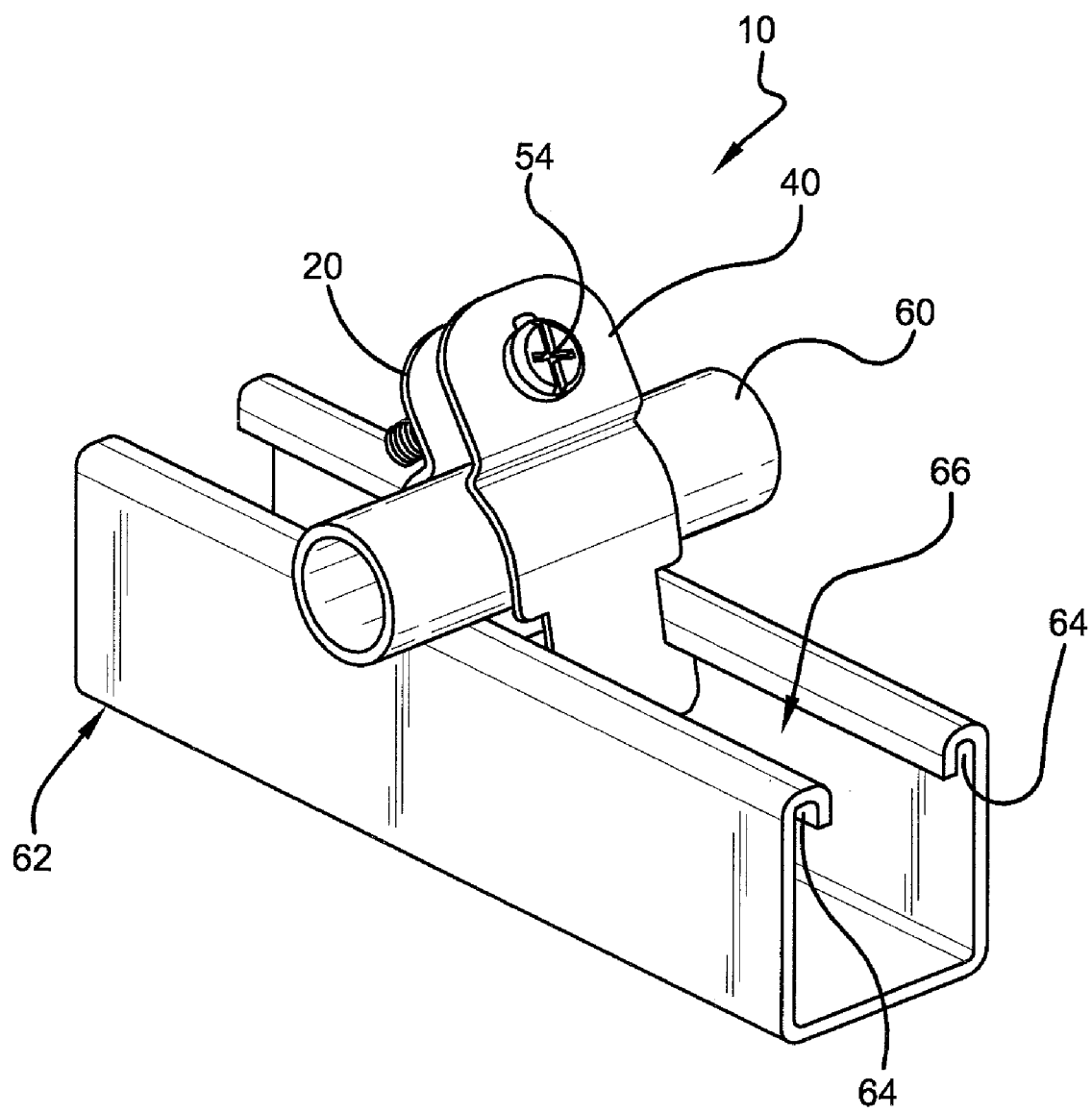
FIG. 1 is a perspective view of a clamp securing a pipe or conduit to a strut or channel, according to one embodiment.
Figure 2:
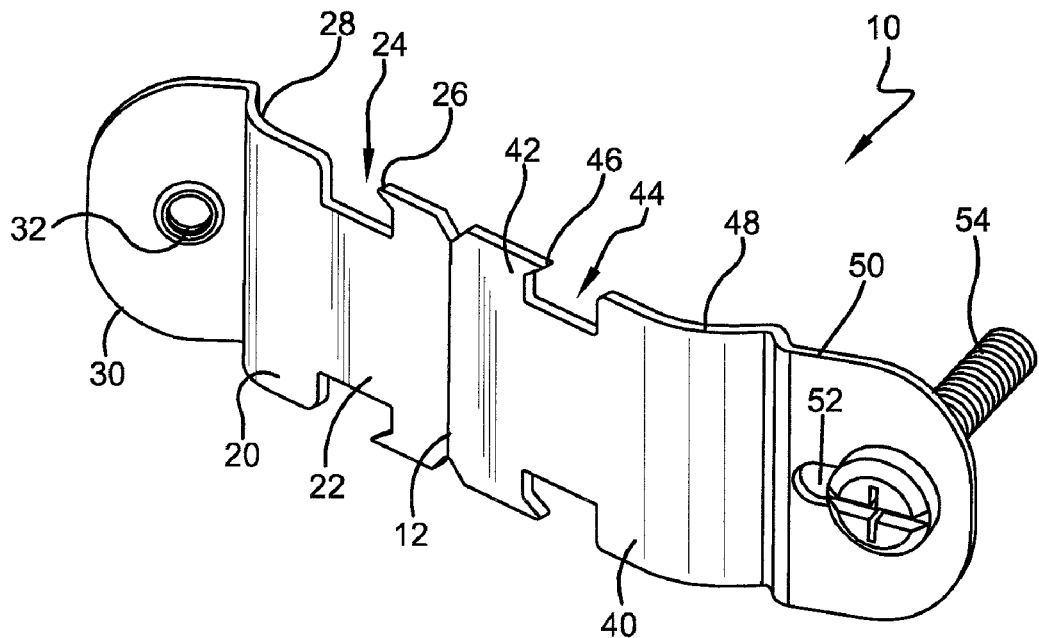
FIG. 2 is a perspective view of a clamp shown in its pre-use form, in according to one embodiment.
Figure 3:
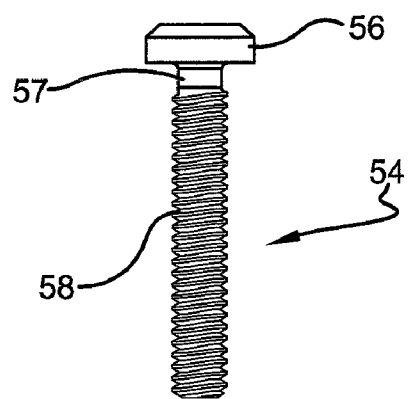
FIG. 3 is a side view of the fastener shown in FIG. 2, according to one embodiment.

Referring now to the drawings wherein the showings are for purposes of illustrating embodiments of the invention only and not for purposes of limiting the same, and wherein like reference numerals are understood to refer to like components, FIG. 1 shows a clamp 10 securing an elongate article 60 to a structural member 62, according to one embodiment of this invention. The clamp 10 may includes straps 20, 40, with one strap positioned on each side of the elongate article 60. The clamp 10 may include a pair of straps 20, 40 and a fastener 54 connecting the two straps 20, 40. Some non-limiting examples of elongate articles 60 are pipes or conduits. A single clamp 10 is capable of accepting and securing different sizes of pipe or conduit 60 having different cross-sectional sizes. For a non-limiting example, the clamp 10 may be designed to sufficiently secure separately both a ½" nominal sized pipe or conduit and a ¾" nominal sized pipe or conduit. The nominal size of a pipe or conduit is not the same as the actual outside diameter of the pipe or conduit. For example, a ½" nominal size pipe has an actual outer diameter of 0.840", while a ¾" nominal size pipe has an actual outer diameter of 1.050". For EMT conduit, a ½" EMT conduit has an outer diameter of 0.706", while a ¾" EMT conduit has an outer diameter of 0.922". For RGD conduit, a ½" RGD conduit has an outer diameter of 0.840", while a ¾" RGD conduit has an outer diameter of 1.050". Some non-limiting examples of structural members 62 are struts or channels. The structural member 62 may include a channel 66 and a pair of projections or projecting edges 64.

With reference now to FIGS. 2-5, the clamp 10 is shown in a pre-use condition with the strap 20 attached to the second strap 40 with a joint 12. Prior to use, the straps 20, 40 are separated at joint 12. The clamp 10 can initially be provided as one piece or as two separate straps 20, 40. The strap 20 may include an attachment end 22, an intermediate portion 28, and a connection end 30. The strap 20 may include an aperture 32 in the connection end 30. The aperture 32 can be threaded. The threads in aperture 32 can be created during the stamping process or formed by tapping after stamping. The strap 20 may include a pair of recesses 24, 24 located in the attachment end 22. The strap 20 may include a pair of extensions or protrusions 26, 26 extending at least partially into the recesses 24, 24. The strap 40 may include an attachment end 42, an intermediate portion 48, and a connection end 50. The strap 40 may include an aperture 52 in the connection end 50. The aperture 52 can be an elongated slot. The strap 40 may include a pair of recesses 44, 44 located in the attachment end 42. The strap 40 may include a pair of extensions or protrusions 46, 46 extending at least partially into the recesses 44, 44. The fastener 54 may include a head 56, a shoulder 57, and a threaded shank 58. The diameter of the shoulder 57 can be smaller than the diameter of the threaded shank 58, which can maintain the fastener 54 within the elongated slot 52 and still allow the fastener 54 to move along the length of the slot 52.

Figure 4:
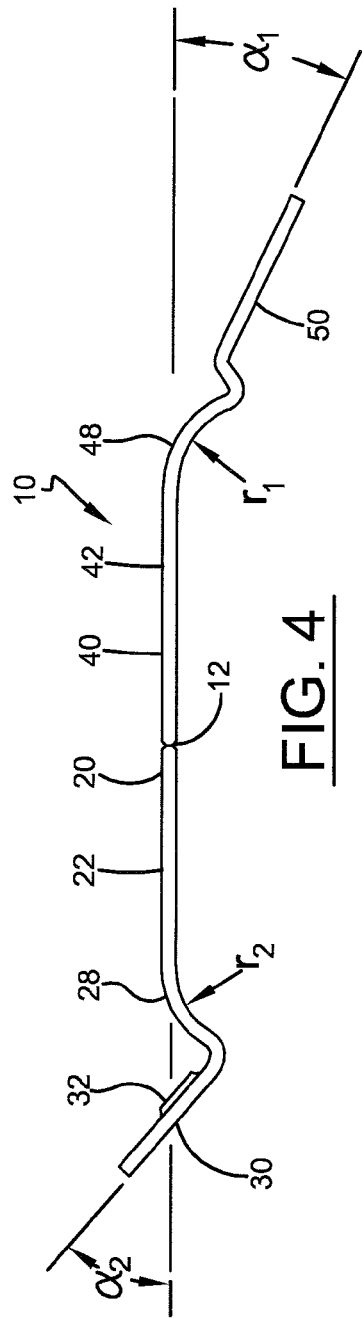
FIG. 4 is a side view of the clamp shown in FIG. 2 without the fastener, according to one embodiment.
Figure 5:
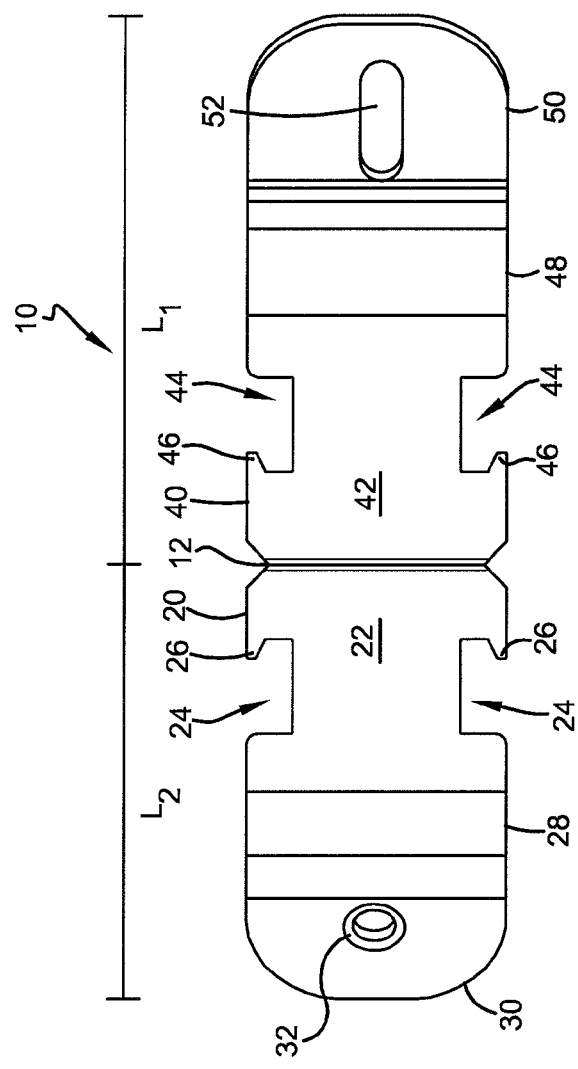
FIG. 5 is a bottom view of the clamp shown in FIG. 2 without the fastener, according to one embodiment.

With reference now to FIGS. 4 and 5, clamp 10 is capable of accepting and securing different sized pipes and conduits. The clamp 10 can be designed to accept and secure any range of sizes or diameters of elongate articles 60. In one embodiment, clamp 10 can accept and secure either a ½" or a ¾" nominal size pipe or conduit. In another embodiment, clamp 10 can accept and secure a 1", 1¼", or 1½" nominal size pipe or conduit. In another embodiment, clamp 10 can accept and secure a 2" or 2½" nominal size pipe or conduit. In another embodiment, clamp 10 can accept and secure a 3", 3½", or 4" nominal size pipe or conduit. The clamp 10 may include two different sized straps 20, 40, in which the first strap 40 is sized to secure a first size of pipe or conduit and the second strap 20 is sized to secure a second size of pipe or conduit. When the clamp 10 is designed to secure two or more different sizes of pipes or conduits, one strap can be sized to secure the largest size pipe or conduit and the second strap can be sized to secure the smallest size pipe or conduit. When the clamp 10 is designed to secure a large number of different size pipes and conduits, one strap can be sized to secure the larger sizes of pipes or conduits and the second strap can be sized to secure the smaller sizes of pipes or conduits. Any two different sizes can be chosen for the two straps by a person having ordinary skill in the art.

With continuing reference to FIGS. 4 and 5, strap 40 has a length $L_1$ and strap 20 has a length $L_2$. In one embodiment, the length $L_1$ of the strap 40 can be longer than the length $L_2$ of the strap 20. The lengths $L_1$ and $L_2$ can be any length chosen by a person having ordinary skill in the art. The ratio of $L_1$ to $L_2$ ($L_1/L_2$) can be any ratio chosen by a person having ordinary skill in the art. The ratio of $L_1/L_2$ can be between approximately 1.0 and approximately 2.0, inclusive. The ratio of $L_1/L_2$ can be between approximately 1.1 and approximately 1.9, inclusive. The ratio of $L_1/L_2$ can be between approximately 1.2 and approximately 1.8, inclusive. The ratio of $L_1/L_2$ can be between approximately 1.2 and approximately 1.7, inclusive. The ratio of $L_1/L_2$ can be between approximately 1.2 and approximately 1.6, inclusive. The ratio of $L_1/L_2$ can be between approximately 1.2 and approximately 1.4, inclusive. The ratio of $L_1/L_2$ can be between approximately 1.3 and approximately 1.5, inclusive. The ratio of $L_1/L_2$ can be between approximately 1.4 and approximately 1.6, inclusive. The ratio of $L_1/L_2$ can be between approximately 1.3 and approximately 1.4, inclusive. The ratio of $L_1/L_2$ can be between approximately 1.4 and approximately 1.5, inclusive. The ratio of $L_1/L_2$ can be between approximately 1.5 and approximately 1.6, inclusive. In one embodiment, the ratio of $L_1/L_2$ is approximately 1.3. In another embodiment, the ratio of $L_1/L_2$ is approximately 1.4. In another embodiment, the ratio of $L_1/L_2$ is approximately 1.45. In another embodiment, the ratio of $L_1/L_2$ is approximately 1.5.

With reference to FIG. 4, the intermediate portion 48 of first strap 40 may have an inside radius $r^1$, or radius of curvature. In one embodiment, the inside radius $r^1$ is approximately equal to or similar to the outside radius of one size of pipe or conduit. The intermediate portion 28 of second strap 20 may have an inside radius $r^2$, or radius of curvature. In one embodiment, the inside radius $r^2$ is approximately equal to or similar to the outside radius of a second size of pipe or conduit. The inside radii $r^1$ and $r^2$ can be any radius chosen by a person having ordinary skill in the art. The inside radii $r^1$ and $r^2$ can be different or can be the same. In some embodiments, the inside radius $r^1$ is larger than the inside radius $r^2$. In one embodiment, the intermediate portion 48 of strap 40 may have an inside radius $r^1$ of approximately 0.5 inches, and the intermediate portion 28 of strap 20 may have an inside radius $r^2$ of approximately 0.4 inches. In another embodiment, the intermediate portion 48 has an inside radius $r^1$ of approximately 0.500 inches, and the intermediate portion 28 has an inside radius $r^2$ of approximately 0.375 inches. In another embodiment, the intermediate portion 48 has an inside radius $r^1$ of approximately 0.375 inches, and the intermediate portion 28 has an inside radius $r^2$ of approximately 0.250 inches. In another embodiment, the intermediate portion 48 has an inside radius $r^1$ of approximately 1.0 inches, and the intermediate portion 28 has an inside radius $r^2$ of approximately 0.6 inches. In another embodiment, the intermediate portion 48 has an inside radius $r^1$ of approximately 0.956 inches, and the intermediate portion 28 has an inside radius $r^2$ of approximately 0.582 inches. In another embodiment, the intermediate portion 48 has an inside radius $r^1$ of approximately 1.4 inches, and the intermediate portion 28 has an inside radius $r^2$ of approximately 1.1 inches. In another embodiment, the intermediate portion 48 has an inside radius $r^1$ of approximately 1.438 inches, and the intermediate portion 28 has an inside radius $r^2$ of approximately 1.099 inches. In another embodiment, the intermediate portion 48 has an inside radius $r^1$ of approximately 2.3 inches, and the intermediate portion 28 has an inside radius $r^2$ of approximately 1.7 inches. In another embodiment, the intermediate portion 48 has an inside radius $r^1$ of approximately 2.275 inches, and the intermediate portion 28 has an inside radius $r^2$ of approximately 1.743 inches.

With continuing reference to FIG. 4, the connection end 50 may extend from the strap 40 at an angle $alpha_1$ ($\alpha_1$). The connection end 30 may extend from the strap 20 at an at an angle $alpha_2$ ($\alpha_2$). The angles $\alpha_1$ and $\alpha_2$ can be any angle chosen by a person having ordinary skill in the art. The angles $\alpha_1$, $\alpha_2$ can be different or the same. In some embodiments, the angle $\alpha_2$ is larger than the angle $\alpha_1$. The angle $\alpha_1$ can be between approximately 0 degrees and approximately 90 degrees, inclusive. The angle $\alpha_1$ can be between approximately 15 degrees and approximately 45 degrees, inclusive. The angle $\alpha_1$ can be between approximately 15 degrees and approximately 40 degrees, inclusive. The angle $\alpha_1$ can be between approximately 20 degrees and approximately 35 degrees, inclusive. The angle $\alpha_1$ can be between approximately 25 degrees and approximately 35 degrees, inclusive. The angle $\alpha_1$ can be between approximately 20 degrees and approximately 30 degrees, inclusive. The angle $\alpha_1$ can be between approximately 30 degrees and approximately 40 degrees, inclusive. In one specific embodiment, the angle $\alpha_1$ can be approximately 25 degrees. In another specific embodiment, the angle $\alpha_1$ can be approximately 35 degrees. The angle $\alpha_2$ can be between approximately 0 degrees and approximately 90 degrees, inclusive. The angle $\alpha_2$ can be between approximately 30 degrees and approximately 60 degrees, inclusive. The angle $\alpha_2$ can be between approximately 35 degrees and approximately 60 degrees, inclusive. The angle $\alpha_2$ can be between approximately 30 degrees and approximately 50 degrees, inclusive. The angle $\alpha_2$ can be between approximately 35 degrees and approximately 50 degrees, inclusive. The angle $\alpha_2$ can be between approximately 35 degrees and approximately 45 degrees, inclusive. The angle $\alpha_2$ can be between approximately 40 degrees and approximately 45 degrees, inclusive. In one specific embodiment, the angle $\alpha_2$ can be approximately 40 degrees.

Figure 6:
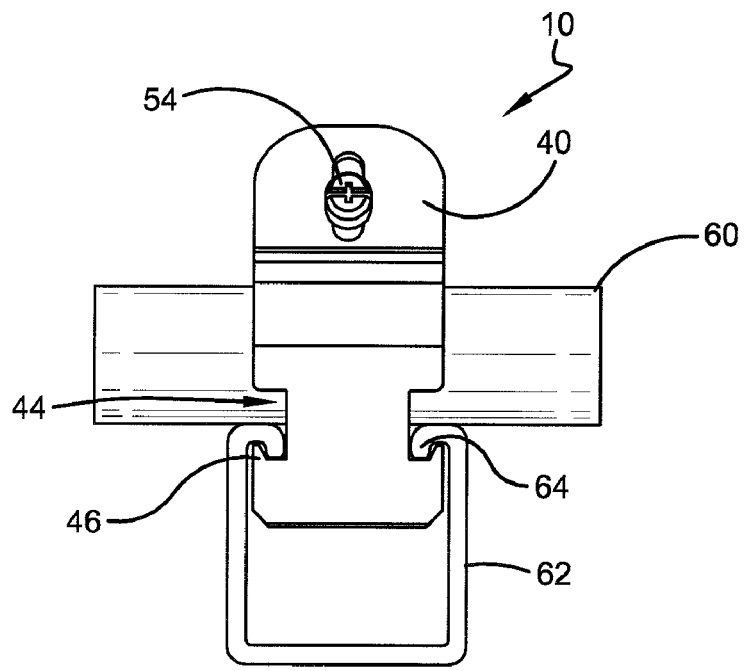
FIG. 6 is an end view of the clamp shown in FIG. 1, according to one embodiment.
Figure 7:
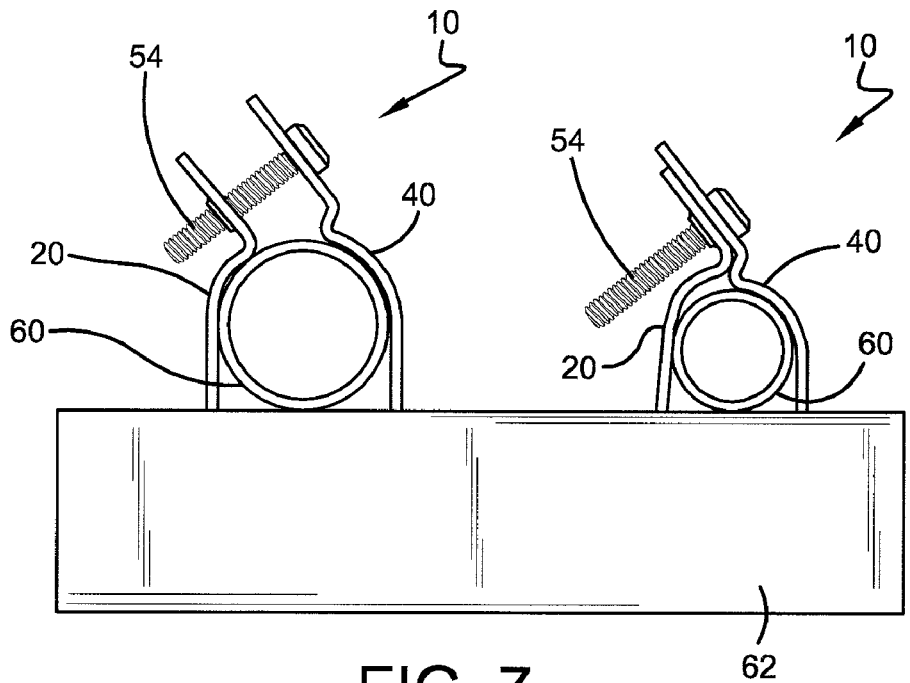
FIG. 7 is a side view of the same clamp in two separate installations with differently sized pipe, according to one embodiment.
Figure 8:
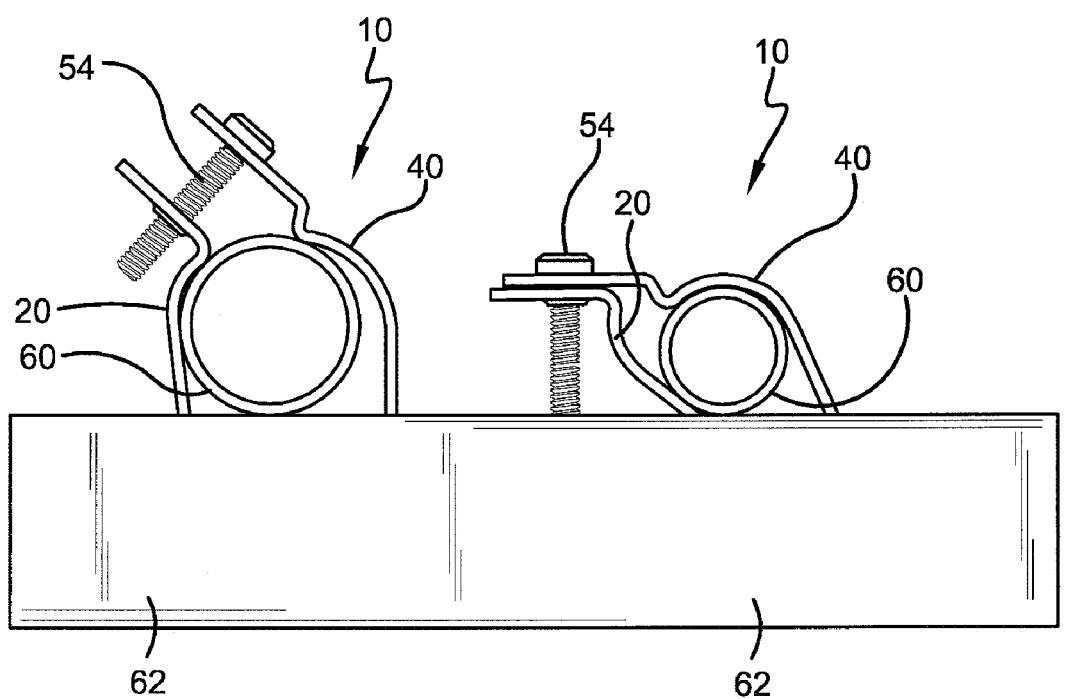
FIG. 8 is a side view of the same clamp in two separate installations with differently sized pipe, according to one embodiment.

With reference now to FIGS. 5 and 6, the clamp 10 can attach or connect to the strut 62 by receiving the projections or projecting edges 64 of strut within the recesses 44, 44 of the strap 40 and recesses 24, 24 of the strap 20. In addition, the extensions or protrusions 26, 26 of strap 20 and the extensions or protrusions 46, 46 of strap 40 may extend into channels formed by the projecting edges 64, 64.

With reference now to all the FIGURES, the clamp 10 secures a pipe or conduit 60 to the strut or channel 62. To secure the pipe 60 to the strut 62, the first strap 40 is positioned on one side of the pipe 60 with the attachment end 22 positioned within the channel 66 of the strut 62. The second strap 20 is positioned on the other side of the pipe 60 with the attachment end 42 positioned within the channel 66 of the strut 62. A fastener 54 then connects the two straps 20, 40 and securely holds the pipe 60 to the strut 62 between the two straps 20, 40, as shown in FIGS. 1 and 6-8.

Numerous embodiments have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

Having thus described the invention, it is now claimed:

1. A clamp apparatus comprising:
 a first strap including an attachment end for attachment to an associated structural member, an intermediate portion having a first radius of curvature for contacting an elongate article, and a connection end having a first aperture for receiving a fastener; and
 a second strap including an attachment end for attachment to an associated structural member, an intermediate portion having a second radius of curvature for contacting the elongate article, and a connection end having a second aperture for receiving the fastener;
 wherein the first radius of curvature is substantially different than the second radius of curvature; and
 wherein the clamp apparatus supports elongate articles of different sizes.

2. The clamp apparatus of claim 1 wherein the first radius of curvature is greater than the second radius of curvature.

3. The clamp apparatus of claim 1 wherein a first angle between the connection end and the intermediate portion of the first strap is less than a second angle between the connection end and the intermediate portion of the second strap.

4. A clamp apparatus comprising:
 a first strap including an attachment end for attachment to an associated structural member, an intermediate portion having a first radius of curvature for contacting an elongate article, and a connection end having a first aperture for receiving a fastener; and a second strap including an attachment end for attachment to an associated structural member, an intermediate portion having a second radius of curvature for contacting the elongate article, and a connection end having a second aperture for receiving the fastener;

wherein the first radius of curvature is substantially different than the second radius of curvature.

5. The clamp apparatus of claim 4 wherein the first radius of curvature is greater than the second radius of curvature.

6. The clamp apparatus of claim 4 wherein the clamp apparatus supports elongate articles of different sizes.

7. The clamp apparatus of claim 4 wherein the first aperture is an elongated slot.

8. The clamp apparatus of claim 7 wherein the second aperture is threaded for receiving a threaded shank of the fastener.

9. The clamp apparatus of claim 8 wherein the fastener comprises a head, a threaded shank, and a shoulder having a smaller diameter than the threaded shank, wherein the width of the elongated slot is sized to maintain the fastener within the elongated slot and still allow the fastener to move along the length of the elongated slot.

10. The clamp apparatus of claim 4 wherein the associated structural member includes a channel and a pair of projecting edges located near the entrance of the channel, and wherein the connection ends of both the first strap and the second strap include a pair of recesses for receiving the pair of projecting edges of the associated structural member.

11. The clamp apparatus of claim 4 wherein the elongate article is selected from the group consisting of a pipe and a conduit.

12. A clamp apparatus comprising:

a first strap including an attachment end for attachment to an associated structural member, an intermediate portion having a first radius of curvature for contacting an elongate article, and a connection end having a first aperture for receiving a fastener; and a second strap including an attachment end for attachment to an associated structural member, an intermediate portion having a second radius of curvature for contacting the elongate article, and a connection end having a second aperture for receiving the fastener;

wherein a first angle between the connection end and the intermediate portion of the first strap is different than a second angle between the connection end and the intermediate portion of the second strap.

13. The clamp apparatus of claim 12 wherein the first angle is less than the second angle.

14. The clamp apparatus of claim 12 wherein the first angle is less than about forty degrees, and wherein the second angle is greater than or equal to about forty degrees.

15. The clamp apparatus of claim 12 wherein the first angle is less than or equal to about thirty five degrees, and wherein the second angle is greater than or equal to about forty degrees.

16. The clamp apparatus of claim 12 wherein the first angle is about twenty five degrees, and wherein the second angle is about forty degrees.

17. The clamp apparatus of claim 12 wherein the first angle is about thirty five degrees, and wherein the second angle is about forty degrees.

18. The clamp apparatus of claim 12 wherein the first aperture is an elongated slot, and wherein the second aperture is threaded for receiving a threaded shank of the fastener.

19. The clamp apparatus of claim 18 wherein the fastener comprises a head, a threaded shank, and a shoulder having a smaller diameter than the threaded shank, wherein the width of the elongated slot is sized to maintain the fastener within the elongated slot and still allow the fastener to move along the length of the elongated slot.

20. The clamp apparatus of claim 12 wherein the associated structural member includes a channel and a pair of projecting edges located near the entrance of the channel, and wherein the connection ends of both the first strap and the second strap include a pair of recesses for receiving the pair of projecting edges of the associated structural member.

* * * * *